(12) United States Patent
Badazhkov et al.

(10) Patent No.: US 11,193,356 B2
(45) Date of Patent: Dec. 7, 2021

(54) METHOD OF GENERATING A FRACTURING DESIGN AND METHOD OF HYDRAULIC FRACTURING

(71) Applicant: Schlumberger Technology Corproation, Sugar Land, TX (US)

(72) Inventors: Dmitry Viktorovich Badazhkov, Novosibirsk (RU); Vladimir Alexandrovich Plyashkevich, Novosibirsk (RU); Ivan Vladimirovich Velikanov, Novosibirsk (RU); Dmitry Sergeevich Kuznetsov, Novosibirsk (RU); Oleg Valerievich Kovalevsky, Moscow (RU); Vadim Ismailovich Isaev, Novosibirsk (RU); Denis Viktrovich Bannikov, Novosibirskaya Oblast (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 60 days.

(21) Appl. No.: 16/499,077

(22) PCT Filed: Mar. 31, 2017

(86) PCT No.: PCT/RU2017/000190
§ 371 (c)(1),
(2) Date: Sep. 27, 2019

(87) PCT Pub. No.: WO2018/182444
PCT Pub. Date: Oct. 4, 2018

(65) Prior Publication Data
US 2020/0040708 A1    Feb. 6, 2020

(51) Int. Cl.
*E21B 43/267*   (2006.01)
*E21B 41/00*    (2006.01)
(Continued)

(52) U.S. Cl.
CPC ............ *E21B 41/0092* (2013.01); *C09K 8/64* (2013.01); *C09K 8/685* (2013.01); *C09K 8/70* (2013.01);
(Continued)

(58) Field of Classification Search
None
See application file for complete search history.

(56) References Cited

U.S. PATENT DOCUMENTS 7,082,993 B2    8/2006   Ayoub et al.
7,451,812 B2    11/2008  Cooper et al.
(Continued)

FOREIGN PATENT DOCUMENTS

WO    2012174065 A1    12/2012
WO    2013101702 A1    7/2013
(Continued)

OTHER PUBLICATIONS

Harlow F.H., Dickman D.O., Harris D.E., et al. "Two-Dimensional Hydrodynamic Calculations", Los Alamos Scientific lab. Rep. NLA-2301, 1959, 97 pages.
(Continued)

*Primary Examiner* — Andrew Sue-Ako

(57) ABSTRACT

The provided method allows optimizing the fracturing design (frac design) while taking into account the two-dimensional modelling of the transport processes in the fracture. The generation of the fracturing design in a well comprises the steps of: obtaining data on hydraulic fracturing including the proppant pumping schedule and the fibre pumping schedule for various types of fibres; generating a degradation matrix for the various types of fibres; generating possible options of the hydraulic fracturing operation according to the fibre type and pumping schedule. Moreover, the method of hydraulic fracturing, which comprises gen-
(Continued)

erating a schedule of fracturing in a well, preparing a fracturing fluid containing carrier fluid, proppant, additives, and fibres, and pumping the fracturing fluid into the formation through the well following the selected (optimal) option of the fracturing operation, is provided.

18 Claims, 8 Drawing Sheets

(51) Int. Cl.
| | |
|---|---|
| *C09K 8/64* | (2006.01) |
| *C09K 8/68* | (2006.01) |
| *C09K 8/70* | (2006.01) |
| *C09K 8/80* | (2006.01) |
| *E21B 49/00* | (2006.01) |
| *G01V 1/40* | (2006.01) |
| G06F 111/10 | (2020.01) |
| E21B 47/07 | (2012.01) |

(52) U.S. Cl.
CPC .............. *C09K 8/80* (2013.01); *E21B 43/267* (2013.01); *E21B 49/00* (2013.01); *G01V 1/40* (2013.01); *C09K 2208/08* (2013.01); *E21B 47/07* (2020.05); *G06F 2111/10* (2020.01)

(56) References Cited

U.S. PATENT DOCUMENTS

| | | | |
|---|---|---|---|
| 7,775,278 | B2 | 8/2010 | Willberg et al. |
| 7,784,544 | B2 | 8/2010 | Lindvig et al. |
| 9,085,975 | B2 | 7/2015 | Abad |
| 2010/0263870 | A1* | 10/2010 | Willberg ................ E21B 43/04 166/305.1 |
| 2015/0053403 | A1 | 2/2015 | Potapenko et al. |
| 2016/0102244 | A1* | 4/2016 | Takahashi .............. C08G 63/08 507/219 |
| 2016/0139588 | A1* | 5/2016 | Huang .................... E21B 43/26 700/275 |

FOREIGN PATENT DOCUMENTS

| | | |
|---|---|---|
| WO | 2015061553 A1 | 4/2015 |
| WO | 2016079625 A1 | 5/2016 |

OTHER PUBLICATIONS

Han et al., "Numerical Study of Proppant Transport in Complex Fracture Geometry", SPE 180243, Society of Petroleum Engineers, May 2016, 14 pages.
Karantinos et al., "Choke Management Strategies for Hydraulically Fractured Wells and Frac-Pack Completions in Vertical Wells", SPE 178973, Society of Petroleum Engineers, Feb. 2016, 20 pages.
International Search Report of International Patent Application No. PCT/RU2017/000190 dated Dec. 7, 2017; 3 pages (with English translation).
Written Opinion of International Patent Application No. PCT/RU2017/000190 dated Dec. 7, 2017; 4 pages.
Vasudevan et al., "Field Test of a Novel Low Viscosity Fracturing Fluid in the Lost Hills Field, California", Society of Petroleum Engineers, SPE 68854, Mar. 2001, 11 pages.
Engels et al., "A Mechanical Methodology of Improved Proppant Transport in Low-Viscosity Fluids: Application of a Fiber-Assisted Transport Technique in East Texas", SPE 91434, Society of Petroleum Engineers, Sep. 2004, 11 pages.
Tskhakaya et al., "The Particle-In-Cell Method", Contributions to Plasma Physics, vol. 47(8-9), p. 563-594.
International Preliminary Report on Patentability of International Patent Application No. PCT/RU2017/000190 dated Dec. 7, 2017; 7 pages.12.

* cited by examiner

METHOD OF GENERATING A FRACTURING DESIGN AND METHOD OF HYDRAULIC FRACTURING

The present disclosure is directed to the area of stimulation of productive formation using the hydraulic fracturing (frac) technology, and, in particular, to hydraulic fracturing starting from the fracturing design.

BACKGROUND

Hydraulic fracturing (frac) is a commonly applied method for intensification of oil and gas production. It is based on creating the extended permeable fractures in an oil and gas bearing formation, which results in an increased area and rate of production. To keep the fracture open, a proppant is used. The development of extended fractures and uniform proppant deposition therein is ensured by pumping a mixture of fluid, fibres, and other functional additives. Modelling of the correct fracture propagation and proppant transport within the fracture is a critical aspect, since uniform deposition of proppant within the fracture determines the fracture conductivity, which ensures increased rate of liquid hydrocarbon production from the formation.

There are several hydraulic fracturing technologies, wherein fibres are added to the proppant slurry to increase the effective viscosity of the slurry. Degradable fibres are often added to the proppant slurry, which provides the desired fracture conductivity without damaging the formation. The contribution of the fibre additive in the fracturing fluid (the proppant slurry thickened with a water-soluble polymer) is in increasing the effective viscosity of the fracturing fluid and in reducing the proppant settling velocity. The fibres dispersed in the fluid (with a reasonable concentration) mechanically interact with the proppant particles, thus reducing the Stokes settling velocity of solid particles in the viscous fluid. In developing the frac design, the effect of added fibres is usually taken into account as an additional viscosity of the fracturing fluid. This contribution is also referred to as the fibre transport capacity, as the fluid with added fibres provides enhanced proppant transport for longer distances deeper in the fracture.

The advantage of using the degradable fibres in hydraulic fracturing is that upon pumping the fracturing fluid, the fibres do not have enough time to degrade, but still increase the effective medium viscosity, while after forming the proppant pack in the fracture, the polymer fibres gradually degrade (the degradation rate depends on such factors as temperature, pH, fibre material), which increases the proppant pack conductivity.

When pumping the fracturing fluid into the formation with an elevated formation temperature, the degradation of the fibre mechanical properties (fibre stiffness loss) occurs already in the process of hydraulic fracturing rather than after the proppant pack formation. Currently, all approaches used for the fracturing modelling (in the frac simulators) do not take into account such factors as decrease in the carrier fluid viscosity or fibre degradation (with degradation depending on the environmental parameters, i.e. temperature and pH of the aqueous fluid). However, the laboratory tests to determine the proppant particles settling velocity in the fluid at a given temperature can provide the specific "critical time" for functionality of the degradable fibres (the fibre lifetime).

The temperature of the fracturing fluid gradually increases from the surface temperature to the formation temperature. The process of pumping the fracturing fluid is also accompanied by the changes in fluid rheology. The viscosity of the fluid thickened with a polymer varies as a function of temperature and shear load; the additives change chemical composition and physical properties of the fracturing fluid; viscosity breaker performs its function.

The multiparameter behaviour of the fracturing fluid is solved using appropriate physical and chemical models built into the frac simulators.

The use of a physical and chemical model and adjustment of the model for the optimal proppant transport are disclosed in U.S. Pat. No. 9,085,975 Method of Treating a Subterranean Formation and Forming Treatment Fluids Using Chemo-Mathematical Model and Process Control (filed on Mar. 5, 2010, Schlumberger Technology Corporation). The treatment method (hydraulic fracturing) comprises tracking the properties of the fluid selected from a group containing pH, temperature, shear viscosity, loss modulus, complex modulus, fluid density, chemical composition, concentration of additives, crosslinking degree, molecular weight of additives, temperature of the onset of crosslinking, thermal thinning of fluid, proppant settling velocity, pressure, spectroscopic data, etc. The transport model is being continuously updated (or updated offline), and one of the flows (the carrier fluid flow, proppant flow, or liquid additive flow) is being adjusted to attain the desired hydraulic fracturing parameters. In other words, the proppant transport model takes into account the evolution of properties of the carrier fluid that is pumped into the rock. However, such model has no provisions to take into account the effect of the present fibres (in particular, the degradable fibres) on the fracturing design.

A study of the proppant settling and in the transport properties of the carrier fluid is described in SPE180243 (Han, J., Yuan, P., Huang, X., Zhang, H., Sookprasong, A., Li, C., & Dai, Y. (2016, May 5). Numerical Study of Proppant Transport in Complex Fracture Geometry. Society of Petroleum Engineers. doi:10.2118/180243-MS), SPE174973 (Karantinos, E., Sharma, M. M., Ayoub, J. A., Parlar, M., & Chanpura, R. A. (2016, Feb. 24). Choke Management Strategies for Hydraulically Fractured Wells and Frac-Pack Completions in Vertical Wells. Society of Petroleum Engineers. doi:10.2118/178973-MS). The disclosed models describe the proppant distribution in the planar branched fractures, but they make no account of the increased transport parameters of the carrier fluid due to the added fibre.

Previously, it has been found that fibres added to the fracturing fluid may be used to improve the proppant transport at low viscosities and/or lower slurry flow rates ((see publications SPE68854 (Vasudevan, S., Willberg, D. M., Wise, J. A., Gorham, T. L., Dacar, R. C., Sullivan, P. F., . . . Mueller, F. (2001, Jan. 1). Field Test of a Novel Low Viscosity Fracturing Fluid in the Lost Hills Field, Calif. Society of Petroleum Engineers. doi:10.2118/68854-MS) and SPE91434 (Engels, J. N., Martinez, E., Fredd, C. N., Boney, C. L., & Holms, B. A. (2004, Jan. 1). A Mechanical Methodology of Improved Proppant Transport in Low-Viscosity Fluids: Application of a Fiber-Assisted Transport Technique in East Texas. Society of Petroleum Engineers. doi:10.2118/91434-MS)) provided that the parameters of the fibre additive were chosen correctly (the fibre concentration, fibre length and diameter, fibre stiffness). Fibres in the slurry improve conductivity of the proppant pack and prevent the proppant flowback at the production stage.

The state of the art methods of hydraulic fracturing using the fracturing fluid containing proppant (propping agent) and fibres are based on trial and error. Overestimation of the transport capacity of the degradable fibre results in a non-uniform proppant distribution over the fracture volume and degrades the hydraulic fracturing stimulation efficiency. A method of estimating the efficiency of different fracturing pumping schedules is desired; and the optimal option of the frac design based on one or two optimization criteria is selected. This allows reducing the expenses for performing suboptimal hydraulic fracturing on a real well.

The state of the art methods suffers from risks of performing hydraulic fracturing related to overestimation or underestimation of the fibre transport properties. A reduced concentration of the added fibres results in a risk of the premature proppant settling in the fracture (incomplete fracture propping). When the concentration of the fibre additive in the proppant slurry exceeds its optimal value, the high fibre concentration poses the risks of fibre bridging and increases the load on pumping equipment. An accurate prediction of the fibre transport capacity in the proppant slurry mitigates said risks.

Therefore, there remains a need in a method of modelling fibre degradation in the fracturing fluid upon the hydraulic fracturing operation.

SUMMARY

The present disclosure provides optimization of the fracturing design (schedule) while taking into account two-dimensional modelling of the transport processes in the fracture.

The generation of the fracturing design in a well comprises the steps of: obtaining data on hydraulic fracturing including the proppant pumping schedule and the fibre pumping schedule for various types of fibres; generating a degradation matrix for the various types of fibres; generating possible options of the hydraulic fracturing operation according to the fibre type and pumping schedule.

Based on input data as the formation parameters, fluid, proppant, fibres, and the pumping schedule, a two-dimensional hydraulic fracturing model for time intervals of the pumping schedule is generated based on the transport equations. Then, the two-dimensional model is iterated with the chosen time steps until the pumping schedule is completed; after that, the data of the two-dimensional hydraulic fracturing model is output. Based on the output data of the hydraulic fracturing model, the option of the hydraulic fracturing operation is selected according to the fibre type to optimize hydraulic fracturing, wherein the hydraulic fracturing option is selected for the given optimization parameter.

The optimization parameter is maximal for an option of the fibre type. The method of the fracturing design is based on evaluating one of the hydraulic fracturing optimization parameters: area of the propped fracture region, height of the fracture, length of the propped fracture region, total amount of the fibre additive in the pumping schedule.

The disclosure also describes a method of hydraulic fracturing. The method of hydraulic fracturing comprises preparing a design of fracturing in a well, preparing a fracturing fluid containing carrier fluid, proppant, additives, and fibres, and pumping the fracturing fluid into the formation through the well following the selected (optimal) option of the hydraulic fracturing operation.

DETAILED DESCRIPTION OF EMBODIMENTS

The present disclosure specifies several non-limiting examples of possible means of implementing this disclosure. The embodiments of the disclosure may use any technical means known in the art and suitable for embodying. All numerical values and ranges disclosed herein are to be understood as modified with the word "about".

Figure 1:
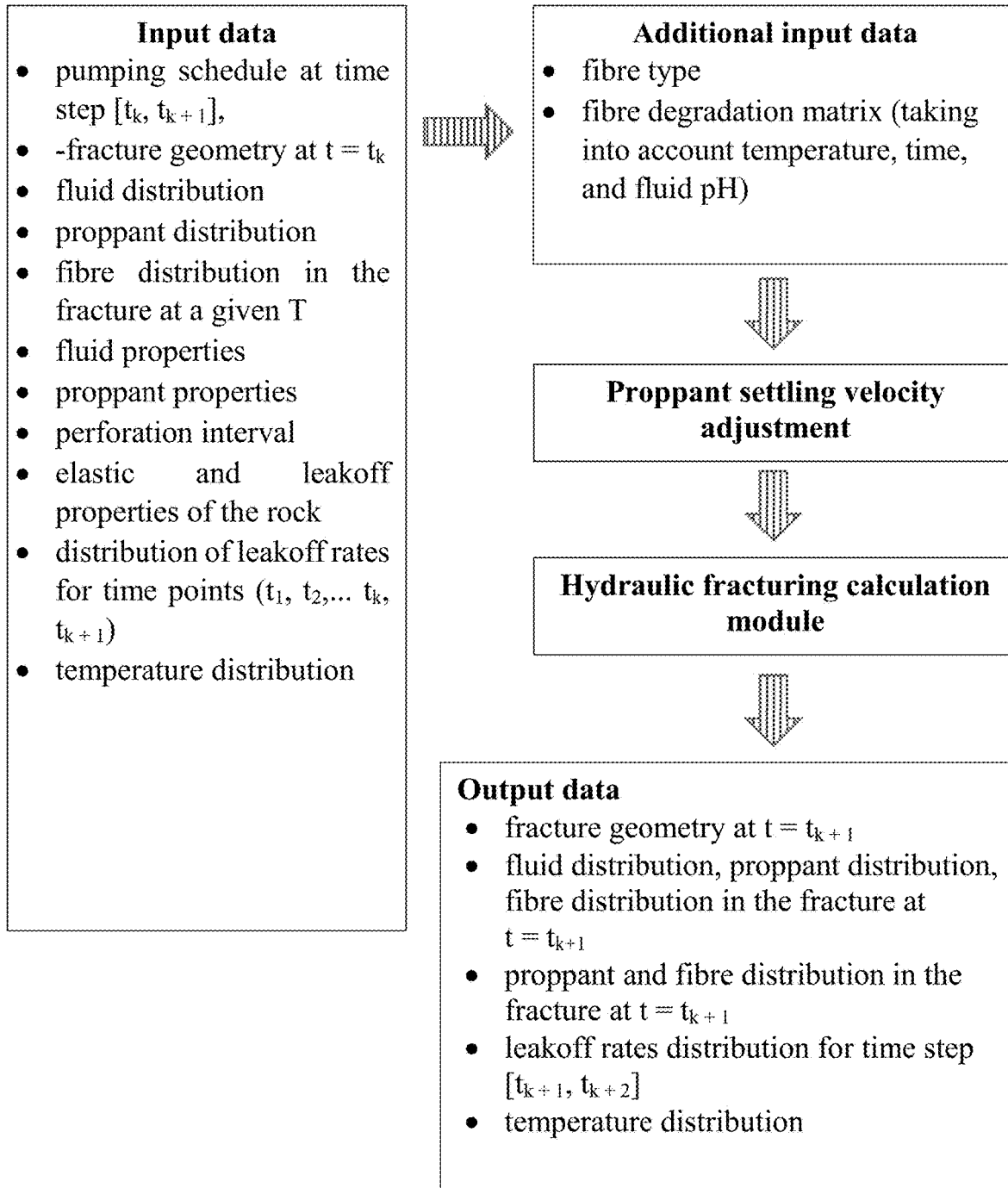
FIG. 1 illustrates the scheme of generating the fracturing design with two-dimensional fracture modelling.

FIG. 1 shows the diagram of modelling the dynamic process of hydraulic fracturing (frac simulator) describing the common input and output parameters, as well as variables defined for each cell of the computational domain (for the specific time step in the fracture modelling). In this case, the two-dimensional hydraulic fracturing model is a set of mathematical solutions and methods capable of providing the results of hydraulic fracturing (output data) on the basis of input parameters. The input parameters at a current time step $[t_k, t_{k+1}]$ consist of the pumping schedule, fracture geometry at $t=t_k$, weight concentration distributions of proppant and fibre at $t=t_k$, properties of fluids and proppants, description of perforation openings, elastic and formation leakoff properties of the rock, distribution of leakoff rates (diffusion into the rock) for times $t_1, t_2, t_k, \ldots, t_{k+1}$.

The output parameters after completing the current time step are as follows: fracture geometry at $t=t_{k+1}$, distributions of proppant and fibre over the cells of the computational domain (within the fracture) at $t=t_{k+1}$, distribution of leakoff rates for time step $[t_{k+1}, t_{k+2}]$. After completing the current time step, the modelling continues until its final completion over all prescribed time steps.

The fibre concentration is considered when taking into account the matrix of fibre degradation. The current fibre concentration (depending on the temperature history for the fibres in the cell) is accounted for in the additional block "Proppant settling velocity adjustment". The adjusted proppant settling velocity (i.e. Stokes settling velocity of rounded particles in the viscous fluid) is taken into account for each modelling cell at the next time step t+1. The fracture process modelling continues until the planned pumping schedule has been completed (e.g., a given mass of proppant has been pumped). Thereafter, the following calculated data for the two-dimensional hydraulic fracturing model are output for the main modelling variables: proppant concentration, fibre concentration, fluid temperature distribution.

The laboratory tests to determine the settling velocity of the proppant particles in the fracturing fluid at a given temperature can provide the critical time for functionality of the degradable fibres. In a simplified approach to the problem of the added fibre degradation, after the "critical degradation time", the degradable fibres cease to work (have no effect on the proppant settling velocity), i.e. the effective fibre concentration in a modelling cell turns into zero. As used herein, the term "degradable fibres" means the selection of such type of fibre, which in the course of hydraulic fracturing (less than an hour) loses its strength and stiffness, which decreases the "transport" capacity of the fracturing fluid with such a fibre additive. As opposed to the term above, in oil and gas industry, polymer degradation is usually understood as hydrolysis (complete or partial dissolution) of a polymer fibre, which requires much longer exposure time (several days).

Fibre Degradation and Hydraulic Fracturing Modelling

Different types of fibre for the proppant-fibre slurry in an aqueous carrier fluid are provided in Table 1. The degradable fibres provided in Table 1 have stable mechanical properties up to the critical degradation time $t_{cr}$. The obtained critical degradation time is provided in Table 2, Table 3, Table 4 for a set of temperatures and varying pH. The fibre transport efficiency is characterized as a ratio of the proppant settling velocity in the fracturing fluid without fibres to the proppant settling velocity in the medium with fibres. For example, if these velocities are equal, the fibres exert no effect on the proppant transport (the fibres have already degraded). The higher the ratio of two Stokes settling velocities, the higher the fibre transport efficiency.

As used herein, the term "critical fibre degradation time" $t_{cr}$ refers to the time that has to elapse before the degradable fibre ceases to have any effect on the settling velocity of the solid particles (of proppant). This definition of degradation differs from the parameter of a "complete downhole degradation" of a polymeric material. The time of complete degradation, or "biodegradation time" for a polymer refers to the time of complete downhole hydrolysis (dissolution) of a polymer.

The method of the frac designing uses a new property, i.e. a degradation matrix (table) for fibres of a specific type. The fibre degradation matrix is generated on the basis of the experimental laboratory tests to determine the critical degradation time (lifetime) for the selected fibre type (fibre dispersion in the fracturing fluid).

The fibre additives are preliminarily tested for the downhole degradability in the fracturing fluid (at downhole temperature and pH). If the degradation time of the polymer fibres is estimated as comparable to the duration of the hydraulic fracturing operation, the degradation matrix is generated for different types of fibres.

The notion of the "fracture modelling" is introduced, which refers to the calculation of the fracturing fluid distribution, the proppant concentration and fibre concentration, the specific rate of fluid leakoff into the rock, as well as other hydraulic fracturing parameters. Modelling refers to the calculation of these parameters for each cell of the computational domain. The computational domain is the space of a planar fracture. Note that only half of the modelling space is covered in the fracture modelling, since the second half has a symmetric planar fracture (upon hydraulic fracturing, the cracks propagate at both sides of the perforation opening in a well).

The calculation is performed using the frac simulators known in the art, which compute said parameters by numerically solving the equations of conservation of mass, momentum, and energy in all adjacent modelling cells. The provided method of the fracture modelling and implementation has provisions for taking into account the properties of fibres (in particular, the degradable polymer fibres). The provided method taking into account the fibre degradation in the flow produces a more correct distribution pattern for proppant and fibre in a subterranean formation.

Note that when preparing a frac design to treat an oil-bearing formation with varying temperature, a knowledge of the "fibre temperature history" is required, i.e. the total thermal impact of temperature in a non-uniformly heated fluid on the fibre properties has to be considered. This is achieved using the Particle-In-Cell method described in [Tskhakaya, D.; Matyash, K.; Schneider, R.; Taccogna, F. 2007). "The Particle-In-Cell Method", Contributions to Plasma Physics, Vol. 47(8-9), P. 563-594. The Particle-In-Cell method can be used to track various properties pertaining to each specific "particle", such as flow direction, impact duration, temperature history.

Figure 2:
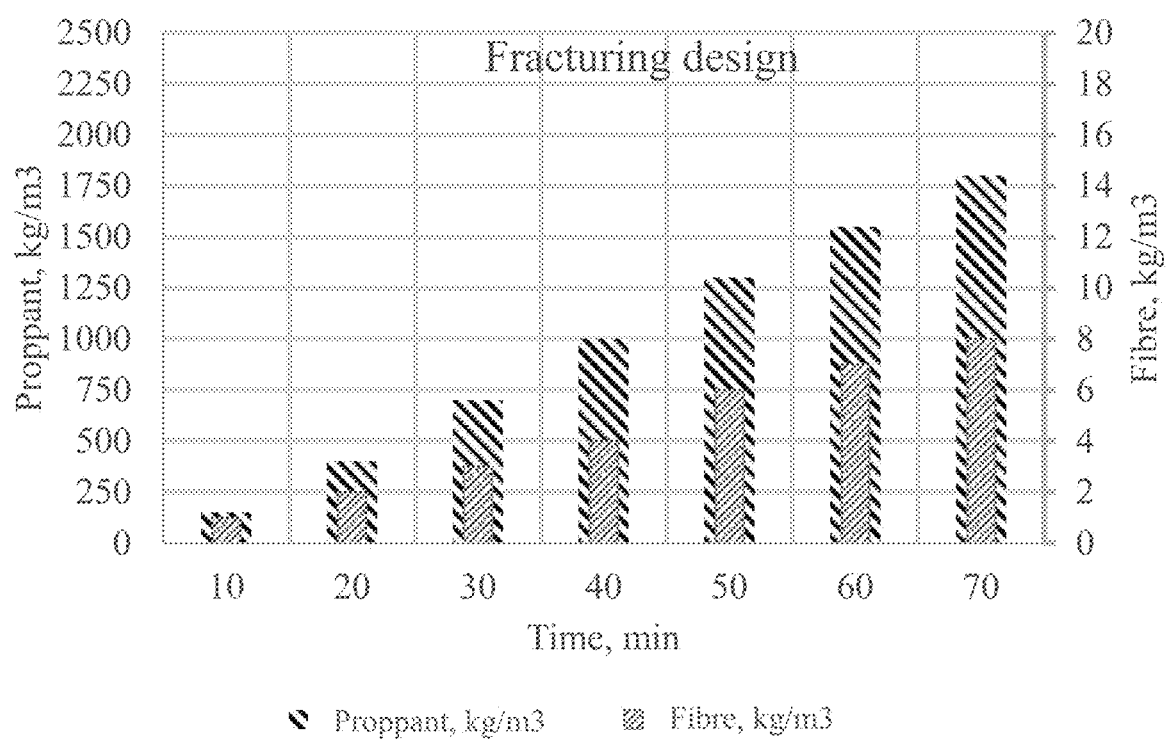
FIG. 2 shows an example of a pumping schedule as a graph of a proppant weight concentration (left coordinate axis) and a fibre weight concentration (right coordinate axis) in the fracturing fluid at time stages.

FIG. 2 shows a typical frac design. To prepare a frac design, initial proppant weight concentration (left axis) and initial fibre weight concentration (right axis) are assigned for time intervals. In the example shown (FIG. 2), a pumping schedule for solid particles (proppant and fibres) with the increasing weight concentration up to the completion of hydraulic fracturing is generated. Depending on the hydraulic fracturing objective, other frac designs are also applied. For example, intervals with a high weight concentration of proppant and fibre alternate with the "clear pulse" pumping intervals without proppant. This technique is known as the method of "channel hydraulic fracturing", or hydraulic fracturing with heterogeneous proppant placement.

In various embodiments of the method, fibre is selected from degradable fibres, non-degradable fibres, or mixtures thereof. The degree of fibre degradation depends on its residence time in the fracture, temperature distribution in the fracture, physical properties of the degradable polymer.

In particular, the method of the fracturing design (frac design) is used in a situation when the fibre melting point is lower than the formation temperature.

The fibre degradation matrix is then generated for the temperature and pH of the fracturing fluid in the formation. In particular, the fibre degradation matrix is generated as a table for critical lifetime of the degradable fibres versus the fracturing fluid properties.

In other embodiments of the method of the fracturing design (frac design), the hydraulic fracturing modelling takes into account the additives to the fracturing fluid. Such additives are known to those of ordinary skill in the art of oil and gas: thickening polymers, thickening polymer crosslinking agents, thickening polymer crosslinking delay agents, emulsion stabilizers, friction reducers, pH regulators, foam stabilizers, biocides, clay swelling regulators, chelating agents. Such additives modify the rheology of the fracturing fluid. The crosslinking agents are added to a water-soluble polymer to increase viscosity of the fracturing fluid, which reduces the proppant settling velocity. The friction reducers are added to the treatment fluid to reduce the load of the pumping equipment.

The method of the fracturing design taking into account the fibre contribution to the proppant distribution is useful for the fracturing fluid, wherein the weight concentration of fibres of different types is within the range of 0.05 to 20 kg/m$^3$.

The method of the fracturing design is useful for the weight concentration of proppant within the range of 0.1 to 400 kg/m$^3$.

A method of hydraulic fracturing according to the optimal frac design is provided, wherein the carrier fluid is selected from the group of: aqueous fluid, aqueous fluid with polymer to reduce friction, foam fluid, carrier fluid thickened with water-soluble polymer, water-in-oil emulsion, oil-in-water emulsion. These fluids have different rheologies, which are taken into account as input data on fluid properties. The carrier fluid thickened with a water-soluble polymer is furthermore thickened using ionic polymer crosslinking agents. The example of ionic polymer crosslinking agents is borate ion for the aqueous guar solution. Other suitable ionic crosslinking (gelling) agents for water-soluble polymers include salts of trivalent metals (such as Al, Cr, Sr).

EXAMPLES

The examples described below provide the data on modelling the hydraulic fracturing process with the selection of different types of fibre, as well as the selection of different types of carrier fluid (crosslinked gel, emulsion). Based on the results of modelling for different pumping schedules, the hydraulic fracturing optimization parameter is compared, and based on it, the optimized design of fracturing in the well is generated. The examples of fracture modelling are performed for one option of organizing the perforation interval. The perforation interval refers to the interval of the casing, through perforation openings in which the fracturing fluid is pumped at a pressure exceeding the fracture pressure of the formation. Conditions at the perforation interval are used as input data for two-dimensional modelling of the hydraulic fracturing process.

Example 1

Example 1 shows options for generating the degradation matrix for fibres of different types (5 types of fibre at varying pH of the carrier fluid). The different types of polymer fibre are described with the parameters typical of the proppant transport: length, diameter and shape of fibres, polymer crystallinity, melting point of the fibre material, type of the fibre material (degradable/non-degradable).

The selection of the fibre types and generation of the fibre degradation matrix the (data on critical fibre lifetime) are performed depending on the fluid temperature and pH, fibre exposure time in the aqueous fluid. The degradation rate (polymer softening) of the degradable polymer fibres is known to depend on the degree of polymer crystallinity, its melting point, as well as on the temperature of the medium and other external parameters.

Polymer fibres (1-5) tested as a fibre additive to the fracturing fluid are provided in Table 1.

TABLE 1

| | |
|---|---|
| Fibre 1 | Industrial L-polylactide (D-isomer content less than 3%), degree of crystallinity 30%. Fibre length 6 mm, diameter 12 mcm, straight (not crimped). Polymer melting point 160° C. |
| Fibre 2 | Industrial L-polylactide (D-isomer content less than 3%), degree of crystallinity 30%. Fibre length 3 mm, diameter 8 mcm, crimped. Polymer melting point 160° C. |
| Fibre 3 | Industrial L-polylactide (D-isomer content less than 10%), degree of crystallinity 10%. Fibre length 6 mm, diameter 12 mcm, straight. Polymer melting point <140° C. |
| Fibre 4 (high-temperature) | Stereocomplex of L-polylactide and D-polylactide with the equal content of both components, degree of crystallinity 40%. Fibre length 6 mm, diameter 12 mcm, crimped. Polymer melting point 220° C. |
| Fibre 5 (non-degradable fibre) | Polyethylene terephthalate, impurity content less than 0.5%, degree of crystallinity 30%. Fibre length 6 mm, diameter 12 mcm, straight. Polymer melting point 260° C. (Does not degrade at fluid temperatures up to about 220° C.). |

The fibre degradation matrices were determined (measured in the laboratory) for the fracturing fluids with varying pH levels (in the basic range): pH=12.3; pH=11.5; pH=13. These experimental data describe the ability of the fibre slurry to keep proppant suspended (i.e. lower the proppant settling velocity in the viscous fluid). The fibre degradation characteristics as the critical lifetime ($t_{cr}$) for the fibre-proppant slurry in the viscous fluid (borate-linked guar gel at basic pH) are provided in Table 2, Table 3, Table 4.

TABLE 2

(gel at pH = 11.5)
$t_{cr}$, min

| Fracturing fluid temperature, ° C. | Fibre 4 | Fibres 1 and 2 | Fibre 3 | Fibre 5 |
|---|---|---|---|---|
| 176 | 0.3 | 0 | 0 | >24 hrs |
| 160 | 10 | 0 | 0 | >24 hrs |
| 149 | 20 | 0 | 0 | >24 hrs |
| 135 | 35 | 1.5 | 0 | >24 hrs |
| 121 | 55 | 9 | 0 | >24 hrs |
| 104 | 130 | 30 | 6 | >24 hrs |
| 93 | >200 | 150 | 20 | >24 hrs |
| 82 | >400 | 20 hrs | 40 | >24 hrs |

TABLE 3

(gel at pH = 12.3)
$t_{cr}$, min

| Fracturing fluid temperature, ° C. | Fibre 4 | Fibres 1 and 2 | Fibre 3 | Fibre 5 |
|---|---|---|---|---|
| 176 | 1 | 0 | 0 | >24 hrs |
| 160 | 10 | 0 | 0 | >24 hrs |
| 149 | 70 | 0 | 0 | >24 hrs |
| 135 | 35 | 5 | 0 | >24 hrs |
| 121 | 55 | 25 | 0 | >24 hrs |
| 104 | 130 | 100 | 20 | >24 hrs |
| 93 | >200 | 450 | 60 | >24 hrs |
| 82 | >400 | 72 hrs | 120 | >24 hrs |

TABLE 4

| | (gel at pH = 13.0) $t_{cr}$, min | | | |
|---|---|---|---|---|
| Fracturing fluid temperature, ° C. | Fibre 4 | Fibres 1 and 2 | Fibre 3 | Fibre 5 |
| 176 | 2 | 0 | 0 | >24 hrs |
| 160 | 25 | 0 | 0 | >24 hrs |
| 149 | 60 | 1 | 0 | >24 hrs |
| 135 | 10 | 13 | 0 | >24 hrs |
| 121 | 1.50 | 75 | 5 | >24 hrs |
| 104 | 390 | 300 | 60 | >24 hrs |
| 93 | >500 | 1,200 | 180 | >24 hrs |
| 82 | >1 day | >1 day | 360 | >24 hrs |

Column (5) in Tables 2-4 shows the data for virtually non-degradable polymer fibre made of PET. For the PET fibre, the critical lifetime at the given conditions is more than two days, while the duration of the pumping schedule measures in minutes. This fibre was used for comparison of the transport capacity of the degradable polymer fibres (fibres 1, 2, 3, 4).

Example 1 shows that, for the selected polymer fibres, at fluid temperatures above 121° C., the fibre critical lifetime ($t_{cr}$, min) varies in the range of several minutes to several dozens of minutes. This indicates that, over the course of hydraulic fracturing, the effective fibre concentration will decrease due to the fibre degradation. The decrease in the fibre concentration $C_f$ is accompanied by an increase in the proppant settling velocity v and a change in the resulting distribution pattern for proppant in the fracture after the completion of hydraulic fracturing. Rapidly degrading fibres, when added to the fracturing fluid, create a certain distribution of the proppant concentration (calculated as proppant mass (kg) per 1 m² of the crack area and readily converted into the weight concentration in kg/m³).

For thermostable fibres in a well with a low formation temperature (82-120° C.), the effect of degradation will be low, and this effect is not taken into account during the fracture modelling.

Example 2

Example 2 describes the way the changes in the proppant settling velocity due to the added fibres are incorporated in a two-dimensional hydraulic fracturing model based on the transport equations. As a result of solving the transport equations (equations of conservation of mass, momentum, and energy) for each cell of the computational domain the proppant weight concentration $C_p$ in the cell and the fibre weight concentration $C_f$ in the cell are available.

The proppant settling velocity in the absence of fibre is calculated using algorithm from publication [Schiller L., Naumann A., Uber die grundlegende Berechnung bei der Schwekrafttaufbereitung, Ver.Deutch. Ing., N44. P. 318-320].

Let us denote the proppant settling velocity as v. In the presence of fibres with the given initial weight concentration $C_f$ at $t>t_{cr}$ (after complete degradation), the proppant settling velocity does not change: v1=v.

For a non-zero fibre concentration in the cell (for $t<t_{cr}$), the proppant settling velocity in the proppant-fibre slurry (at the fibre concentration $C_f$) is calculated using a correction coefficient $H_{sbase}$: $v1 = v \cdot H_{sbase}$, where the coefficient depends on the fibre geometric parameters and is associated with the proppant and fibre concentrations in the cell:

$$H_{sbase} = a_1 e^{-(a_2 C^*_p + a_3 C^*_f)}, (\text{if } H_{sbase} < 1, H_{sbase} = 1),$$

where $C_p$ is the proppant concentration in ppg (pounds per gallon, or 119 kg/m³), $$C^*_p = C_p(\text{in ppa})120\left(\frac{kg}{m^3}\right)\bigg/\left(C_p(\text{in ppa})120\left(\frac{kg}{m^3}\right) - \rho\left(\frac{kg}{m^3}\right)\right)$$

is the proppant volume concentration,
ρ is the specific proppant concentration $$\left(\frac{kg}{m^3}\right),$$

$C_f$ is the fibre concentration in ppt (pounds/1,000*gallon), $$C^*_f = C_f(\text{in ppa})0.12\left(\frac{kg}{m^3}\right)\bigg/\rho_f\left(\frac{kg}{m^3}\right)$$

is the fibre weight concentration,
$\rho_f$ is the specific fibre density $$\left(\frac{kg}{m^3}\right),$$

The coefficients a1, a2, a3 for function $H_{sbase}$ are obtained experimentally for several types of fibres (see selection of fibre 1-5 in Table 1):
 Fibre 1: a1=7; a2=0.3; a3=0.07;
 Fibre 2: a1=6.3; a2=0.3; a3=0.07;
 Fibre 3: a1=8.75; a2=0.3; a3=0.07;
 Fibre 4: a1=1.9612; a2=0.523; a3=0.1697;
 Fibre 5: a1=0.7; a2=0.3; a3=0.07;
Thus, the proppant settling velocity with adjustment for the weight concentration of fibre of the selected type is known for each cell of the computational domain (the fracture space).

Example 3

Figure 3:
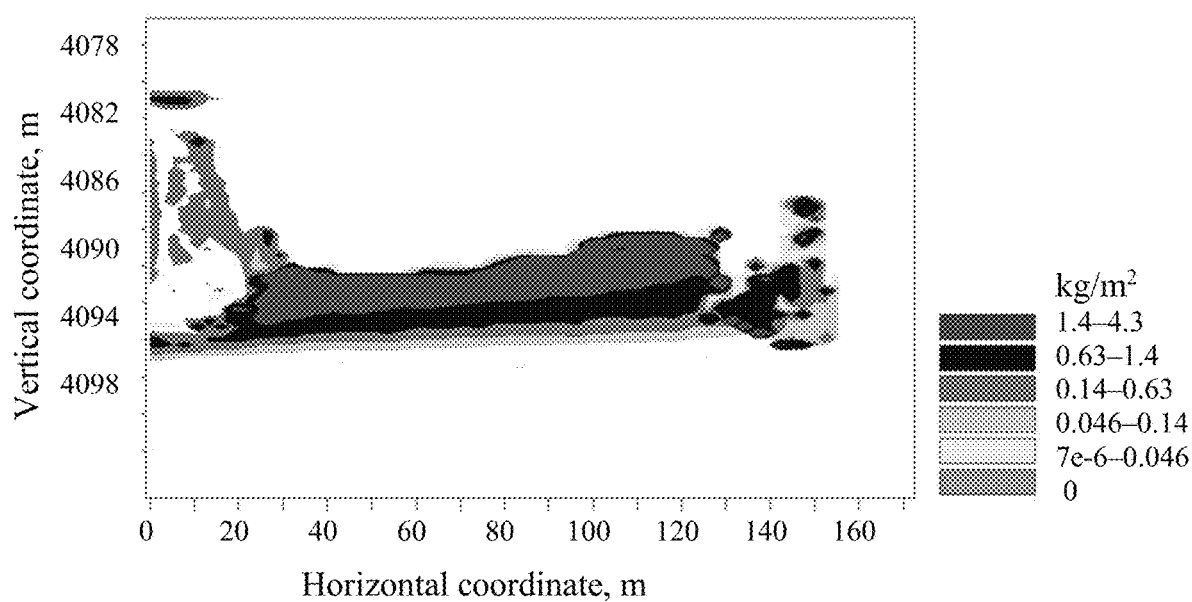
FIG. 3 shows the result of two-dimensional fracture modelling for a pumping schedule with a constant proppant weight concentration (without fibre). Proppant concentration distribution in the fracture volume is provided.

The frac design (the proppant concentration distribution) was generated using a frac simulator. A highly viscous fluid (borate crosslinked guar solution) was used as the carrier fluid. The fracture is modelled for the following pumping schedule: proppant type 20/40 BORPROP™ (constant initial weight concentration of 360 kg/m³, fibre not added ($C_f$=0). FIG. 3 shows the results of modelling for the proppant concentration distribution in the fracture (after completing the pumping schedule, i.e. the final result of the fracture modelling). The final proppant concentration distribution (kg/m²) over the crack area is an indicator of the fracture region propping. In this example, the lower limit for fracture propping is the local proppant concentration of 0.14 kg/m² or higher. Regions with the low proppant density (<0.14 kg/m²) cannot resist the fracture closure stress after the completion of hydraulic fracturing: such non-propped regions (light tone in the graph) cannot provide the high fracture conductivity.

FIG. 3 shows that the total propping area for proppant without fibre does not exceed 25% of the crack area (low propping). The absence of fibre in the fracturing fluid resulted in an inefficient proppant distribution as the proppant turned out to settle down in the lower part of the fracture. The fracture length (the rightmost coordinate of the propped region) was found to be 150 m based on the modelling results.

Figure 4:
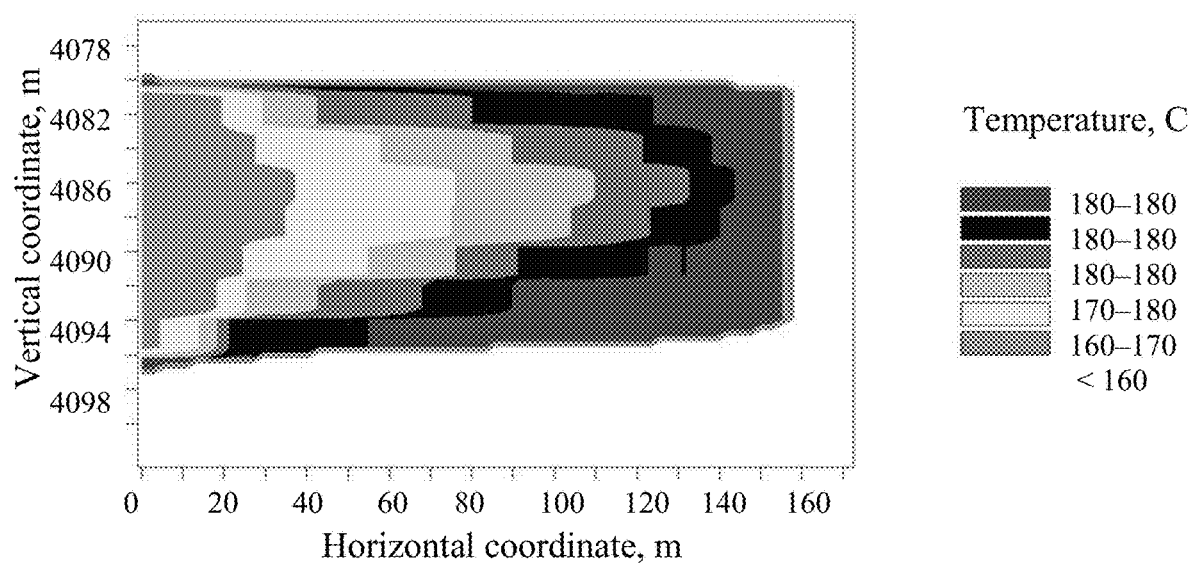
FIG. 4 shows the result of two-dimensional fracture modelling for a pumping schedule with a constant proppant weight concentration (without fibre). Distribution of the fracturing fluid temperature in the fracture volume is provided.

FIG. 4 shows the modelling results for the temperature distribution in the fracture for pumping the proppant slurry (the fracturing fluid). The modelling temperature in the fracture demonstrates that with the initial fracturing fluid temperature at the surface of 30-40° C., its pumping to the depth of 4 km results in its gradual warming up to 120-140° C. (near the perforation interval). Then, the fluid entering the crack continues to heat due to the thermal contact with the rock. The fracture is characterized by regions of different temperatures, 150° C. to 180° C. FIG. 4 shows the final distribution of the fracturing fluid temperature.

The modelling in Example 3 is the initial reference for comparison of other pumping schedules for proppant and fibres.

The pumping schedules (Examples 4-5) provide a higher frac optimization parameter value due to the addition of polymer fibres (with parameter in this example being the total propping area).

Example 4

The frac design (distribution of fluid temperature in the fracture was modelled) was generated using a frac simulator. An oil-in-water emulsion was used as the carrier fluid. To obtain this, 30% of oil product (diesel fuel) was mixed by active stirring with 2% aqueous KCl solution. The oil-in-water emulsion was stabilized by adding 0.5% amphiphilic surfactant. Then, the frac design is generated for the fibre-proppant slurry in emulsion: proppant type 20/40 BORPROP™ (constant initial weight concentration of 360 kg/m$^3$), fibre of type 1 (L-lactide polymer from Table 1) as the fibre additive with concentration $C_f$=4.8 kg/m$^3$. According to the frac design, the following was delivered to the fracture: total amount of fibre of type 1 is 180 kg, total amount of proppant is 14,000 kg.

Figure 5:
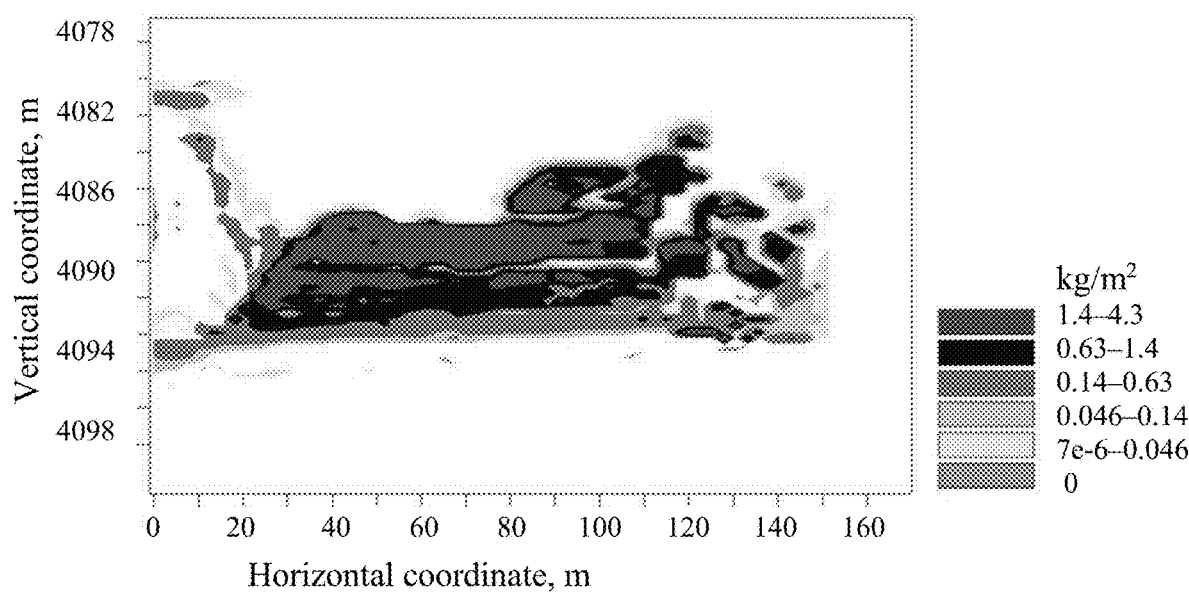
FIG. 5 shows the result of two-dimensional fracture modelling for a pumping schedule with a constant proppant weight concentration with fibre additive of type 1. Proppant concentration distribution in the fracture volume is provided.

FIG. 5 shows the results of modelling for the proppant concentration distribution in the fracture (after completing the pumping schedule, i.e. the final result of modelling for the proppant flow in the fracture). The proppant concentration distribution (kg/m$^2$) over the crack area is an indicator of fracture propping. In this example, the lower limit for fracture propping is the local proppant concentration higher than 0.14 kg/m$^2$.

The distribution of FIG. 5 shows that the total propping area for the proppant mixed with fibre is about 40% of the crack area (moderate fracture propping). This is higher than in the case of pumping the fracturing fluid without fibre (FIG. 3 and FIG. 4). The fracture length (the rightmost coordinate of the propped region) was found to be 140 m based on the results of modelling. The height of the propped fracture was 19 m.

Figure 6:
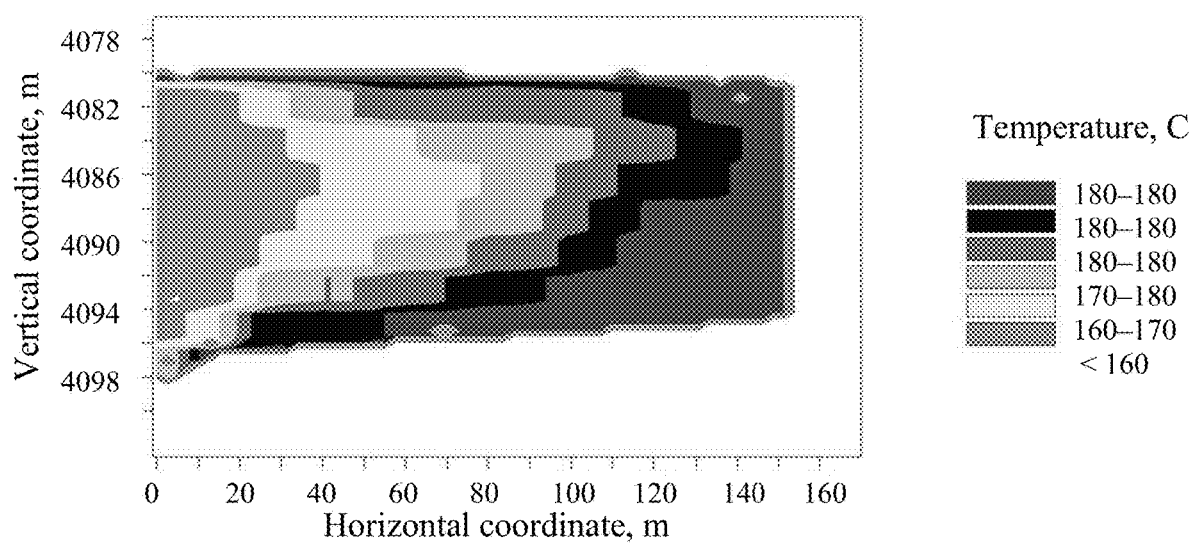
FIG. 6 shows the result of two-dimensional fracture modelling for a pumping schedule with a constant proppant weight concentration with fibre additive of type 1. Carrier fluid is an oil emulsion. Distribution of the emulsion temperature in the fracture volume is provided.

FIG. 6 shows the modelling data for the local temperature distribution in the computational domain (the fracture space) at the end of pumping of the proppant-fibre slurry (with constant initial weight concentration of $C_f$=4.8 kg/m$^3$) in the viscous oil-in-water emulsion. Due to the features of the used format of outputting temperature data, the temperatures of 180° C. and higher are shown with different tones (see legend in the right portion of FIG. 6). Based on the results of modelling, only three working temperature intervals for the fracturing fluid remained: <160° C., 160-170° C., 180° C., and above. This is because by the end of hydraulic fracturing, most of the fluid has already warmed up to the temperature of the surrounding rock (180° C.).

The large difference in the local temperatures within the calculation domain (150° C. to 180° C.) indicates that the fibre degradation matrix (for the fibre type, see Tables 2-4, column 3) has to be taken into account in the calculations of the effective proppant concentration. Furthermore, the effects of the fibre degradation will be seen in the cells with the temperature close to or exceeding the melting point of polymer of type 1 (in this example, the melting point of polymer of type 1 is 160° C. according to Table 1). This temperature excess above the critical degradation temperature is typical of the larger portion of the fracture modelling domain.

Example 5

The frac design (the proppant concentration distribution) was generated using a frac simulator. A highly viscous fluid (borate crosslinked guar solution) was used as the carrier fluid. The fracture is modelled for the following pumping schedule: proppant type 20/40 BORPROP™ (constant initial weight concentration of 360 kg/m$^3$), fibre of type 4 (high-temperature degradable fibre, see Table 1, row 4) as the fibre additive with weight concentration of 4.8 kg/m$^3$.

According to the frac design, the following was delivered to the fracture: total amount of fibre of type 4 (high-temperature DL-polylactide) is 200 kg, total amount of proppant is 14,000 kg.

Figure 7:
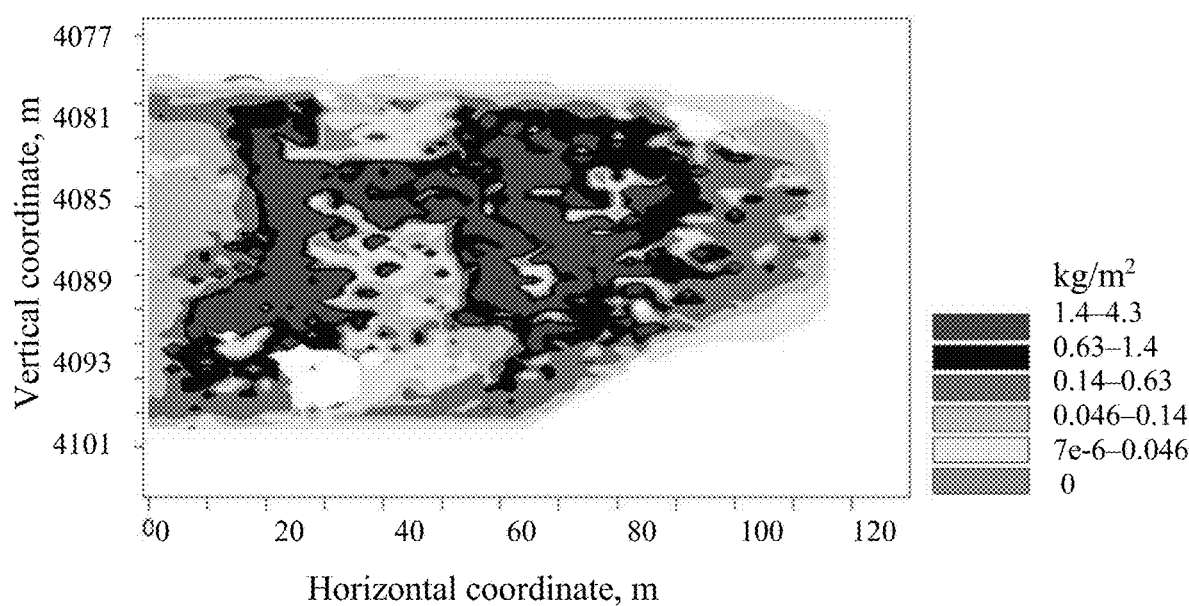
FIG. 7 shows the result of two-dimensional fracture modelling for a pumping schedule with a constant proppant weight concentration with fibre additive of type 4. Proppant concentration distribution in the fracture volume is provided.

FIG. 7 shows the result of modelling for the proppant concentration distribution in the fracture. Modelling with a frac simulator allows estimating intermediate distributions of parameters. FIG. 7 shows the final proppant concentration distribution after completing the pumping schedule.

In this case, the proppant concentration distribution (kg/m$^2$) over the crack area is an indicator of fracture propping. In this example, the "lower limit" for fracture propping is the local proppant concentration higher than 0.14 kg/m$^2$. Regions of lighter tone correspond to the non-propped regions in the calculation domain (fracture closure occurred). FIG. 7 shows that the total propping area for proppant mixed with fibre of type 4 (additive to improve the fluid transport properties) is about 65% of the crack area (high fracture propping).

The fracture length (the rightmost coordinate of the propped region) was found to be 117 m based on the results of modelling. The height of the propped fracture was 21 m.

Figure 8:
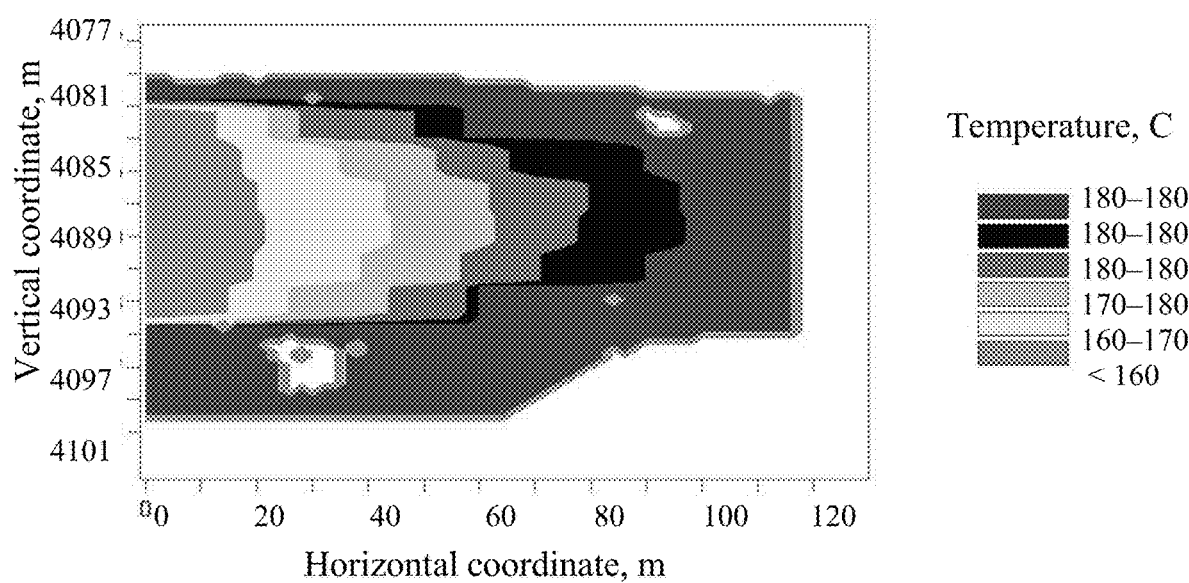
FIG. 8 shows the result of two-dimensional fracture modelling for a pumping schedule with a constant proppant weight concentration with fibre additive of type 4. Distribution of the fracturing fluid temperature in the fracture volume is provided.

FIG. 8 shows the modelling data for the fluid temperature distribution in the fracture at the final stage of the process, before the fracture closure. The temperature distribution demonstrates that over the course of hydraulic fracturing there are fluid temperature gradients from 150 to 180° C. in the fracture. These temperature effects are taken into account, in particular, by using the fibre degradation matrix (Tables 2-4).

The comparison of the propped regions (filled with proppant at high concentration >0.14 kg/m$^2$) for the discussed Examples 3-5 demonstrates that in order to optimize hydraulic fracturing by the degree of propping, the pumping schedule disclosed in Example 5 should be taken: this fracturing design provides the highest hydraulic fracturing optimization parameter (in this case, the fracture propping area).

To optimize the hydraulic fracturing process by the length of the fracture $L_{frac}$, hydraulic fracturing should follow the frac design disclosed in Example 4 (the packed proppant distribution shown in FIG. 5): $L_{frac}$=140 m.

The selected (optimal) pumping schedule as a result of comparison of different options of the fracture modelling becomes the eventual "frac design"; precisely this schedule is used in hydraulic fracturing to achieve highly efficient formation stimulation.

The disclosed method of the fracturing design can be used to avoid unnecessary losses of time and material, which is typical of the "trial and error" approach. The operator discards suboptimal options of the pumping schedule at the stage of computer fracture modelling with a frac simulator. The method provides for the hydraulic fracturing optimization by at least one optimization parameter and evaluation of the efficiency of adding the degrading fibres of different types.

As the hydraulic fracturing optimization parameter for the comparison of different pumping schedules one or more parameters are selected from the following list: area of the propped region of fracture, height of fracture, length of fracture, total amount of fibre in the fracture.

In the embodiment of Example 5, addition of fibre of type 4 (high-temperature polymer) to the fracturing fluid results in an extended propped area of the fracture, which is about 20-40% higher than for the alternative exemplary pumping schedules. These examples also demonstrate that a suitable selection of the fibre type for a high-temperature formation ensures a uniform proppant placement in the fracture by height and thus reduces the risks of fracture bridging and the risks of proppant settling at the fracture bottom.

Although only several exemplary embodiments of the disclosure have been described in detail above, those of skill in the art will readily appreciate that numerous modifications of the provided options are possible without materially departing from the disclosure. Accordingly, all such modifications should be included in the scope of the disclosure as defined in the claims below.

The invention claimed is:

1. A method of generating a design of hydraulic fracturing in a well, which comprising:
   (a) obtaining data on hydraulic fracturing of a formation including a proppant pumping schedule and a fibre pumping schedule for various types of fibres;
   (b) generating a fibre degradation matrix for the various types of fibres, wherein the fibre degradation matrix is obtained for a temperature and a pH of a fracturing fluid in the formation, and the fibre degradation matrix is generated as a table of critical lifetime (critical fibre degradation time $t_{cr}$) of degradable fibre versus fracturing fluid properties;
   (c) generating possible options of hydraulic fracturing according to the fibre type and the pumping schedule;
   (d) generating a two-dimensional hydraulic fracturing model for time intervals of the pumping schedule based on transport equations;
   (e) iterating the two-dimensional model in time until the pumping schedule is completed;
   (f) outputting data of the two-dimensional hydraulic fracturing model;
   (g) selecting an option of the hydraulic fracturing operation according to the fibre type to optimize hydraulic fracturing by at least one parameter.

2. The method of claim 1, wherein generating the two-dimensional model at step (d) comprises generating a computational domain for the fracture and subsequently calculating the data for the hydraulic fracturing operation, which contain the fracture geometry, the proppant settling velocity, the proppant concentration distribution, the fluid temperature, and the concentration of fibres of different types.

3. The method of claim 1, wherein the hydraulic fracturing optimization parameter is the area of the propped fracture region, the height of fracture, the length of the propped fracture region, or the total amount of various types of fibres.

4. The method of claim 1, wherein the various types of fibres are selected from degradable fibres, non-degradable fibres, or mixtures thereof.

5. The method of claim 4, wherein a fibre melting point is lower than the formation temperature.

6. The method of claim 1, wherein the additives are selected from the group consisting of: thickening polymers, thickening polymer crosslinking agents, thickening polymer crosslinking delay agents, emulsion stabilizers, friction reducers, pH regulators, foam stabilizers, biocides, clay swelling regulators, and chelating agents.

7. The method of claim 1, wherein a weight concentration of the various types of fibres is within the range of 0.05 to 20 kg/m$^3$.

8. The method of claim 1, wherein a weight concentration of proppant is within the range of 0.1 to 400 kg/m$^3$.

9. A method of hydraulic fracturing, comprising:
   (a) designing fracturing in a well, which comprises:
   (b) obtaining data on hydraulic fracturing including a proppant pumping schedule and a fibre pumping schedule for various types of fibres;
   (c) generating a fibre degradation matrix for the various types of fibres, wherein the fibre degradation matrix is obtained for a temperature and a pH of a fracturing fluid in the formation, and the fibre degradation matrix is generated as a table of critical lifetime (critical fibre degradation time $t_{cr}$) of degradable fibre versus fracturing fluid properties;
   (d) generating possible options of hydraulic fracturing according to the fibre type and the pumping schedule;
   (e) generating a two-dimensional hydraulic fracturing model for time intervals of the pumping schedule based on transport equations;
   (f) iterating the two-dimensional hydraulic fracturing model in time until the pumping schedules are completed;
   (g) outputting data of the two-dimensional hydraulic fracturing model; and
   (i) selecting an option of the hydraulic fracturing operation according to the fibre type to optimize hydraulic fracturing by at least one parameter;
   (j) preparing a fracturing fluid comprising a carrier fluid, proppant, additives, and fibres; and
   (k) pumping the fracturing fluid into the formation through the well following the selected option of the hydraulic fracturing operation.

10. The method of claim 9, wherein the carrier fluid is selected from the group of: aqueous fluid, aqueous fluid with polymer, foam fluid, carrier fluid thickened with water-soluble polymer, water-in-oil emulsion and oil-in-water emulsion.

11. The method of claim 10, wherein the carrier fluid thickened by a water-soluble polymer is furthermore thickened by using ionic polymer crosslinking agents.

12. The method of claim 9, wherein generating the two-dimensional model at step (e) comprises generating a computational domain for the fracture and subsequently calculating data for the hydraulic fracturing operation, which contain fracture geometry, proppant settling velocity, proppant concentration distribution, fluid temperature and concentration of fibres of different types.

13. The method of claim 9, wherein the hydraulic fracturing optimization parameter is an area of a propped fracture region, fracture height, propped fracture length or a total amount of the various types of fibres.

14. The method of claim 9, wherein the various types of fibres are selected from degradable fibres, non-degradable fibres, or mixtures thereof.

15. The method of claim 9, wherein a fibre melting point is lower than a formation temperature.

16. The method of claim 9, wherein the additives are selected from the group consisting of: thickening polymers, thickening polymer crosslinking agents, thickening polymer crosslinking delay agents, emulsion stabilizers, friction reducers, pH regulators, foam stabilizers, biocides, clay swelling regulators and chelating agents.

17. The method of claim 9, wherein a weight concentration of the various types of fibres is between 0.05 and 20 kg/m$^3$.

18. The method of claim 9, wherein a weight concentration of proppant is between 0.1 and 400 kg/m$^3$.

\* \* \* \* \*